US012654641B2

(12) United States Patent
   Akif

(10) Patent No.: US 12,654,641 B2
(45) Date of Patent: Jun. 16, 2026

(54) DEFORMATION STRUCTURE AND MOTOR VEHICLE HAVING A DEFORMATION STRUCTURE

(71) Applicant: Bayerische Motoren Werke Aktiengesellschaft, Munich (DE)

(72) Inventor: Oeztzan Akif, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 426 days.

(21) Appl. No.: 18/034,457

(22) PCT Filed: Nov. 12, 2021

(86) PCT No.: PCT/EP2021/081557
   § 371 (c)(1),
   (2) Date: Apr. 28, 2023

(87) PCT Pub. No.: WO2022/112023
   PCT Pub. Date: Jun. 2, 2022

(65) Prior Publication Data
   US 2023/0373418 A1    Nov. 23, 2023

(30) Foreign Application Priority Data

Nov. 25, 2020    (DE) ...................... 10 2020 131 234.2

(51) Int. Cl.
   *B60R 19/18*        (2006.01)
   *B60R 19/03*        (2006.01)
(52) U.S. Cl.
   CPC .............. *B60R 19/18* (2013.01); *B60R 19/03* (2013.01); *B60R 2019/186* (2013.01); *B60R 2019/1893* (2013.01)
(58) Field of Classification Search
   CPC ... B60R 19/18; B60R 19/03; B60R 2019/186; B60R 2019/1893
   See application file for complete search history.

(56) References Cited

U.S. PATENT DOCUMENTS

| 3,888,531 A | 6/1975 | Straza et al. |
| 4,890,877 A | 1/1990 | Ashtiani-Zarandi et al. |
| | (Continued) | |

FOREIGN PATENT DOCUMENTS

| AU | 2002321001 B2 | 5/2008 |
| CN | 1529667 A | 9/2004 |
| | (Continued) | |

OTHER PUBLICATIONS

International Search Report (PCT/ISA/210) issued in PCT Application No. PCT/EP2021/081557 dated Jan. 31, 2022 with English translation (six (6) pages).

(Continued)

*Primary Examiner* — Taras P Bemko
(74) *Attorney, Agent, or Firm* — Crowell & Moring LLP

(57) ABSTRACT

A deformation energy absorption structure has at least a first layer and a second layer which are spaced apart from each other and are mounted to be movable relative to each other in the deformation or load direction. The first and second layers have complementary protrusions and recesses, which are designed such that the protrusions of the first layer can dip into the recesses of the second layer and the protrusions of the second layer can dip into the recesses of the first layer. The first layer and the second layer are connected to each other by a deformation control device such that, in the event of a high impulse in the deformation direction, the protrusions of the first layer dip into the recesses of the second layer and the protrusions of the second layer dip into the recesses of the first layer such that the deformation structure is deformed in the deformation direction at a relatively low level of force, and, in the event of a low impulse in the deformation direction, the protrusions of the first layer hit the protrusions of the second layer such that the deformation structure is deformed further in the deformation direction at (Continued)

a relatively high level of force or that a greater force can be transmitted by the deformation structure. The first and second layers are formed from a plurality of deformation base elements which are produced separately from one another and are interconnected.

11 Claims, 4 Drawing Sheets

(56) References Cited

U.S. PATENT DOCUMENTS

| | | | |
|---|---|---|---|
| 2005/0274584 A1* | 12/2005 | Baxter .................... | F16F 7/123 |
| | | | 188/371 |
| 2011/0309653 A1 | 12/2011 | Schuler et al. | |
| 2017/0282825 A1 | 10/2017 | Akif et al. | |
| 2018/0244222 A1 | 8/2018 | Nusier et al. | |
| 2019/0016295 A1 | 1/2019 | Naderer et al. | |
| 2021/0009076 A1 | 1/2021 | Akif et al. | |

FOREIGN PATENT DOCUMENTS

| | | | |
|---|---|---|---|
| CN | 201824978 U | 5/2011 |
| DE | 20 2009 016 759 U1 | 5/2010 |
| DE | 10 2010 054 641 A1 | 6/2012 |
| DE | 10 2012 112 636 A1 | 7/2014 |
| DE | 10 2015 207 610 A1 | 6/2016 |
| DE | 10 2016 204 264 A1 | 9/2017 |
| DE | 20 2018 100 973 U1 | 4/2018 |
| DE | 10 2018 204 656 A1 | 10/2019 |
| DE | 10 2020 201 772 A1 | 10/2020 |

OTHER PUBLICATIONS

German-language Written Opinion (PCT/ISA/237) issued in PCT Application No. PCT/EP2021/081557 dated Jan. 31, 2022 (six (6) pages).

German-language Search Report issued in German Application No. 10 2020 131 234.2 dated Aug. 13, 2021 with partial English translation (10 pages).

English translation of Chinese-language Office Action issued in Chinese Application No. 202180065445.6 dated Apr. 16, 2025 (6 pages).

* cited by examiner

DEFORMATION STRUCTURE AND MOTOR VEHICLE HAVING A DEFORMATION STRUCTURE

BACKGROUND AND SUMMARY

The present invention relates to a deformation structure, in particular for a motor vehicle, for example, a passenger vehicle or a truck, which can be deformed at different force levels in a switchable manner in a pulse-dependent manner and a motor vehicle having such a deformation structure which is arranged between a body outer skin element and a body carrier element.

A known front section of a motor vehicle has, for example, a bumper cross-beam which is secured to front ends of longitudinal carriers and a bumper trim, wherein in order to protect pedestrians a soft foam which can be deformed at a comparatively low load level is arranged between the bumper trim and the bumper cross-beam. As a result of a pedestrian protection, the soft foam is arranged in order to protect a pedestrian where necessary from direct immediate collision with a hard, rigid structure of the motor vehicle, such as, for example, the bumper cross-beam.

Furthermore, there is a requirement that at a very low speed range of, for example, up to 4 km/h, in which the pedestrian protection is not relevant as a result of the low speed, for the motor vehicle to remain free from damage in the event of a collision. To this end, a penetration depth of a collision opponent should be as low as possible.

Furthermore, at a slightly higher speed, which is also still not relevant for pedestrian protection, there is the requirement for damage in the event of a collision to be as small as possible and, for example, for a radiator structure which is located in the front vehicle region not to become damaged. To this end, it would be advantageous for the structure which is located in front of the bumper cross-beam to already have sufficient absorption capacity for collision energy. To this end, a penetration depth of a collision opponent should also be as low as possible.

The various requirements are partially mutually contradictory and require on the front of the vehicle a comparatively long vehicle overhang and consequently a higher weight and an unfavorable influence on the travel dynamics.

In order to overcome the resulting conflicting objectives, there was proposed, for example, in DE 102010054641 A1 a bumper arrangement having a cross-beam which is secured to the vehicle body by means of crash boxes. In the travel direction in front of the cross-beam, a pedestrian protection element for a soft impact of a pedestrian is formed. In addition, there is provided a pivotable energy absorption element which can be pivoted in front of the pedestrian protection element and thereby enables increased energy absorption in the event of collisions in which a higher collision energy absorption capacity of the crash structure of the motor vehicle is required.

DE 102012112636 A1 also sets out a bumper arrangement having a bumper cross-beam and a pedestrian protection element which can be switched by means of an actuator from a rigid state into a comparatively soft state which serves to protect a pedestrian.

The bumper arrangements which are described in DE 102010054641 A1 and DE 102012112636 A1 have in common that a crash or pre-crash sensor system is required for this, wherein based on the output signals of the sensor system it is possible to switch between a hard, rigid state of the crash structure with a high collision energy absorption capacity and a soft state of the crash structure with low collision energy absorption capacity which is favorable for pedestrian protection.

DE 102016204264 A1 further discloses a generic deformation structure which has at least a first layer and a second layer which are arranged in the deformation direction or load direction with spacing from each other and so as to be able to be displaced with respect to each other. The first layer and the second layer have complementary projections and recesses which are constructed in such a manner that the projections of the first layer and the recesses of the second layer and the projections of the second layer and the recesses of the first layer can be introduced into each other. The first layer and the second layer are connected to each other by means of deformable web elements in such a manner that, in the event of a high pulse in the deformation direction, the projections of the first layer are introduced into the recesses of the second layer and the projections of the second layer are introduced into the recesses of the first layer so that a deformation of the deformation structure in the deformation direction is carried out at a relatively low force level, and, in the event of a low pulse in the deformation direction, the projections of the first layer strike the projections of the second layer so that further deformation of the deformation structure in the deformation direction is carried out at a relatively high force level.

An object of the present invention is to provide a deformation structure for a motor vehicle and a motor vehicle having one of the deformation structures, wherein a production of the deformation structure is simpler and more cost-effective.

This object is achieved with a deformation structure and a pedestrian protection apparatus having the features of the independent claims. Advantageous embodiments of the invention are set out in the dependent patent claims.

A deformation structure according to the invention which can also be referred to as an energy absorption structure has at least a first layer and a second layer which are arranged spaced apart from each other in a deformation direction or load direction and so as to be able to be displaced with respect to each other. The first layer and the second layer have complementary projections and recesses which are constructed in such a manner that the projections of the first layer and the recesses of the second layer and the projections of the second layer and the recesses of the first layer can be introduced into each other. The first layer and the second layer are connected to each other by means of a deformation control device in such a manner that, in the event of a high pulse in the deformation direction, the projections of the first layer are introduced into the recesses of the second layer and the projections of the second layer are introduced into the recesses of the first layer so that a deformation of the deformation structure in the deformation direction is carried out at a relatively low force level and, in the event of a low pulse in the deformation direction, the projections of the first layer meet the projections of the second layer so that a further deformation of the deformation structure in the deformation direction is carried out at a relatively high force level or a greater force can be transmitted by the deformation structure. According to the invention, the first layer and the second layer are formed from a large number of deformation base elements which are produced separately from each other and connected to each other.

The deformation structure can, in a manner dependent on a load, that is to say, a collision pulse, be deformed at different energy levels and consequently has different levels of rigidity. The "switching" between the two levels of rigidity is carried out in this instance independently and regardless of a sensor system or an actuator. The adjustment of the rigidity levels is in this instance brought about by means of a specific geometrically complementary shaping of the first layer and the second layer and the connection of the layers by means of the deformation control device. In the case of a low pulse, projections of opposing layers meet each other. As a result of the construction of the deformation structure from a large number of base elements, the deformation structure can be produced in a cost-effective manner. In particular, the deformation structure, depending on the application, that is to say, different vehicle types with different vehicle dimensions and different masses or different requirements and different vehicle markets, may thereby be constructed with more or fewer base elements.

Preferably, the deformation base elements are constructed to be substantially the same, in particular identical.

This enables a particularly cost-effective production of the deformation base elements and consequently the deformation structure since only a single type of deformation base element is required from which a large number of different deformation structures can be formed.

According to the invention, the deformation control device is constructed or produced separately from the first and the second layer and connected to the first layer and the second layer in a releasable or non-releasable manner.

As a result of the separate construction of the layers and the deformation control device, the deformation structure can be produced in a simple, cost-effective manner using production methods which are suitable for large batch quantities. Furthermore, the requirements for the deformation control device which is intended to control a deformation of the deformation structure are different from the requirements for the layers which are intended to be sufficiently stiff and strong, where applicable, in particular at the low pulse, is intended to transmit forces sufficiently so that the separate production permits greater degrees of freedom with a construction in accordance with requirements.

According to a preferred further development of the present invention, each deformation base element has a projection, in particular precisely one complete projection, and/or a recess, in particular precisely one complete recess.

This is the smallest possible unit of a deformation base element, particularly when the deformation base elements of the deformation structure are intended to be constructed to be the same or identical. With this smallest possible unit, the deformation structure can be adapted in the best possible manner to the respective application.

A deformation base element preferably has at opposing ends in each case a connection device for connection to another deformation base element in each case.

In a particularly preferred manner, according to the present invention, the first layer comprises n deformation base elements and the second layer comprises n–1 deformation base elements.

Particularly in the event of a load with the small collision pulse, there is a parallel displacement, that is to say, a lateral displacement, of the two adjacent layers with respect to each other. This parallel displacement leads to the two adjacent layers no longer completely overlapping and in particular a deformation base element becoming ineffective in the event of a collision load with the low collision pulse. Consequently, as a result of the lower number of deformation base elements in the second layer, weight and material can be saved without influencing the function of the deformation structure.

In a particularly preferred manner, the deformation structure has precisely three layers which are arranged one above the other.

Advantageously in this case, the first layer comprises n deformation base elements, the second layer comprises n–1 deformation base elements and the third layer comprises n–2 deformation base elements.

Preferably, the deformation base elements are connected to each other in a materially engaging manner, in particular by means of adhesive bonding or welding.

The deformation base elements may additionally or alternatively be connected to each other in a positive-locking manner. A positive-locking connection could, for example, be a clip-fit connection. The positive-locking connection could be constructed in the manner of a tongue and groove connection.

Furthermore, the deformation element may also be connected to each other in a frictionally engaging manner, for example, by means of a press-fitting.

Advantageously, the deformation base elements may be produced by means of extrusion, in particular from aluminum.

Extrusion is a very cost-effective production method. The deformation base elements can be cut to the desired length from a corresponding extruded profile. Consequently, the deformation base elements are extruded profiles. Aluminum is additionally lightweight and corrosion-resistant.

Alternatively, the deformation base elements may also be produced by means of shaping or by means of injection-molding.

Alternatively, the deformation base elements may also be produced by means of an additive production method.

Furthermore, the deformation structure preferably has a deformation control device which is constructed or produced separately from the layers and which is connected thereto in a releasable or non-releasable manner.

According to a preferred further development of the present invention, the deformation control device is connected to the first layer and/or the second layer by means of a clip-fit connection.

A clip-fit connection is a positive-locking connection having a resiliently flexible undercut engagement.

The deformation structure can thereby be produced in a simple manner by joining the individual elements together.

Furthermore, the deformation control device can be adhesively bonded to the first layer and/or the second layer.

Furthermore, the deformation control device can be pressed with the first layer and/or the second layer in a suitable manner by means of a press-fit.

Furthermore, the deformation control device may be in the form of an injection-molded component, in particular made of plastics material. Injection-molding is a particularly favorable production method with large batch quantities.

Advantageously, the deformation control device may have a plurality of resiliently deformable control webs. The control webs connect the layers to each other and determine in particular a spacing of the layers with respect to each other in a starting position and a kinematics or movement behavior of the layers when a load is introduced in a collision direction depending on the level of a collision pulse.

The resilient construction of the control webs enables a reversibility of the deformation of the deformation structure—at least in specific cases.

According to a preferred further development, at least two deformation control devices are provided. In this instance, the deformation control devices are advantageously arranged at opposing ends or end portions of the first layer and the second layer and connected to the first layer and the second layer.

A deformation of the deformation structure in the event of a load can thereby be better controlled.

The projection of the first layer and the projection of the second layer are constructed to complement each other in such a manner that with a low pulse in the deformation direction in a lateral direction, that is to say, a direction transverse relative to the deformation direction, that is to say, a direction substantially perpendicular to the deformation direction, at least in the lateral direction there is a positive-locking connection between the projection of the first layer and the projection of the second layer.

As a result of the positive-locking connection between the projections, a probability is reduced of the first layer and the second layer being displaced further relative to each other in a lateral direction, that is to say, a direction transverse relative to the deformation direction, that is to say, a direction parallel with the extent of the layers, the projections of the two layers moving out of engagement again and the deformation of the deformation structure potentially thereby taking place in an undesirable manner at a low force level. According to the invention, it is accordingly ensured that the adjacent layers are mutually supported in a reliable manner on opposing projections and the further deformation of the deformation structure is carried out at the relatively high force level or a force transmission is possible at a relatively high force level. The opposing projections or the projections which are introduced into an opposing layer in the course of the collision, have in other words complementary geometries which enable a mutual positive-locking connection of the opposing projections which is in particular effective in a lateral direction.

According to a further development of the deformation structure according to the invention, the projection of the second layer or the projection of the first layer has a recess which is adapted in such a manner that the projection of the first layer—or the projection of the second layer if the recess is formed in the first layer—can engage in the recess so that a movement of the first layer and the second layer with respect to each other is at least limited in the lateral direction, that is to say, at least impeded or even prevented.

The recess enables a positive-locking connection between the opposing projections in the lateral direction. The projection which engages in the recess of the opposing projection cannot be displaced laterally when a collision force acts in the collision direction of the deformation element since for this lateral edges of the recess would have to be overcome which again is made more difficult by the effective collision force. The projection which engages in the recess strikes the corresponding edge of the recess in the event of a sideways movement.

According to another further development of the deformation structure according to the invention, the projection of the second layer and/or the projection of the first layer has/have a step which is adapted in such a manner that the projection of the first layer—or the projection of the second layer if the step is formed on the first projection—can engage with the step in such a manner that a movement of the first layer with respect to the second layer is at least limited in the lateral direction, that is to say, at least impeded or even prevented.

The operating method of the step is similar to the recess, wherein the step inhibits a movement of the adjacent layers in only one lateral direction (transverse direction), whereas the recess mentioned above can also inhibit a movement in another, in particular the opposing, lateral direction. To this end, the step may be constructed to be sufficiently high so that it is ensured that the corresponding projection moves into engagement with the step of the opposing projection in the event of the collision with the low pulse.

It is also possible to combine a recess and a step on a projection with each other, that is to say, to form a projection with a recess additionally with a step which is higher than the edge of the recess.

According to a further development, the first layer and the second layer can be displaced further in a direction parallel with each other by means of the deformation control device.

In particular, the deformation control device may be constructed in such a manner that, in the event of a high collision pulse, it fails in a brittle and/or plastic manner and wherein the deformation control device in the event of a low pulse can be resiliently deformed in a reversible manner. The deformation control device may have control webs which act in a similar manner to a hinge kinematics. The control webs may in this instance bring about a pivot movement of the first layer and the second layer with respect to each other, wherein the first layer and the second layer are displaced parallel with each other and in the deformation direction, that is to say, toward each other.

A defined pivot movement of the first layer and the second layer toward each other is thereby possible and the rigidity-increasing position of the first layer and the second layer with respect to each other can be assumed in a reliable manner.

In the event of a high collision pulse, the failure of the control webs prevents the pivot movement of the first layer and the second layer with respect to each other. As a result of the failure of the control webs, the first layer and the second layer are substantially without any lateral displacement movement only displaced toward each other in the deformation direction.

According to a preferred further development of the deformation structure, the projections of the first layer and the recesses of the second layer and the recesses of the first layer and the projections of the second layer are arranged opposite each other in a starting position of the deformation structure.

The deformation structure can thereby in the event of a low collision pulse be deformed at a relatively high force level in the deformation direction.

According to a particularly preferred further development, the first layer and the second layer are in each case in the form of an undulating plate. Wave peaks and wave troughs in this instance form the projections and the recesses.

The projections and the recesses (wave peaks and wave troughs) may preferably have a trapezoidal shape.

As a result of this geometric shape, the projections and recesses of the opposing layers can be readily displaced one inside the other.

The deformation structure according to the present invention may have a large number of layers, wherein two adjacent layers each form a first layer and a second layer. For example, the deformation structure may have three, four, five, six or more layers.

Furthermore, preferably one or both outer layer(s), that is to say, outer layers or end layers, is/are constructed in a fixed manner.

Preferably, the deformation structure has an uneven number of adjacent layers, which are formed in pairs in accordance with the first layer and the second layer.

The two outermost layers can thereby be constructed in a fixed manner. In this instance, in the event of the low pulse or low force input, only the layers which are arranged therebetween are displaced in a lateral direction.

A particularly preferred deformation structure has precisely three layers.

This is the smallest unit in which the two outermost layers may be constructed in a fixed manner. In this instance, only the central layer which may, for example, be a second layer, is subjected to a parallel displacement with respect to the two outermost layers in the event of the low pulse.

Advantageously, the deformation control device is configured in such a manner that, in the event of the low collision pulse, adjacent layers can be displaced in opposing directions. The terms "displacement action" is in this instance intended, for example, to refer to a pivot movement of the layers in opposing directions.

A uniform deformation of the deformation structure with the large number of layers in the event of the low collision pulse is thereby intended to be achieved.

The present invention also relates to a motor vehicle having a deformation structure according to the invention. In this instance, the deformation structure is preferably arranged between a vehicle outer skin element and a body carrier element.

The deformation structure is supported in this instance on the body carrier element in the event of a collision pulse.

An outer layer may be secured to the body carrier element in a fixed manner. The other outer layer may also be supported in a fixed manner. Preferably, in this instance, an uneven number of layers, in particular three layers, are provided.

The vehicle outer skin element may be a bumper trim. The body carrier element may be a bumper cross-beam.

As a result of the pedestrian protection apparatus according to the invention with the deformation structure, no collision sensor system and no actuator mechanism is required in order where applicable to actively lock or unlock a mechanical mechanism and consequently to be able to switch between a structure having a "soft" deformation behavior and a "rigid" deformation behavior where necessary. The pedestrian apparatus according to the invention with the deformation structure acts independently in accordance with a collision pulse which in turn is dependent on a collision speed of the motor vehicle. The deformation direction is in particular a collision direction and is when used for pedestrian protection in the motor vehicle front substantially a longitudinal vehicle direction.

In principle, however, the protection region of the deformation structure according to the invention also extends to all other application areas in the motor vehicle sector or other technology fields in which a deformability of a deformation structure at different load levels in accordance with a load is required.

Accordingly, with the low collision pulse and consequently the low collision speed of the motor vehicle, a pivoting of the opposing layers is carried out in such a manner that the projections of the opposing layers are opposite each other and are supported on each other. The deformation structure accordingly acts in a rigid manner. In the event of the high collision pulse and consequently the high collision speed, there is no pivoting of the opposing layers so that the opposing projections and recesses of the opposing layer can be displaced inside each other. Consequently, the deformation structure reacts in a softer manner over a longer deformation path.

For example, in the event of a collision pulse which is produced up to a threshold speed of the motor vehicle, the deformation structure can react in a more rigid manner and be deformed at a higher force.

Consequently, at the low collision speed, a collision load can be transmitted to the body element behind—at a very low speed—or, in order to protect components behind, there is sufficient energy absorption by the deformation structure—at a slightly higher speed which is, however, still below the threshold speed. In any case, the repair costs can consequently be reduced, wherein in particular at the very low speed—for example, in the case of so-called parking bumps, for example, up to 4 km/h—the repair costs can where applicable be limited, for example, to the repair of paint damage.

The threshold speed may, for example, be 20 km/h or the like.

Furthermore, in the event of a collision pulse which is produced from and including the threshold speed of the motor vehicle, the deformation structure will react more softly and be deformed at a lower force. This is particularly advantageous in the event of a front-end collision of the pedestrian with the motor vehicle from the threshold speed since lower collision forces act on the pedestrian in this instance.

Developments of the invention set out above can be freely combined with each other wherever possible and advantageous.

DETAILED DESCRIPTION OF THE DRAWINGS

An embodiment of the present invention is described below with reference to FIGS. 1 to 9.

Figure 1:
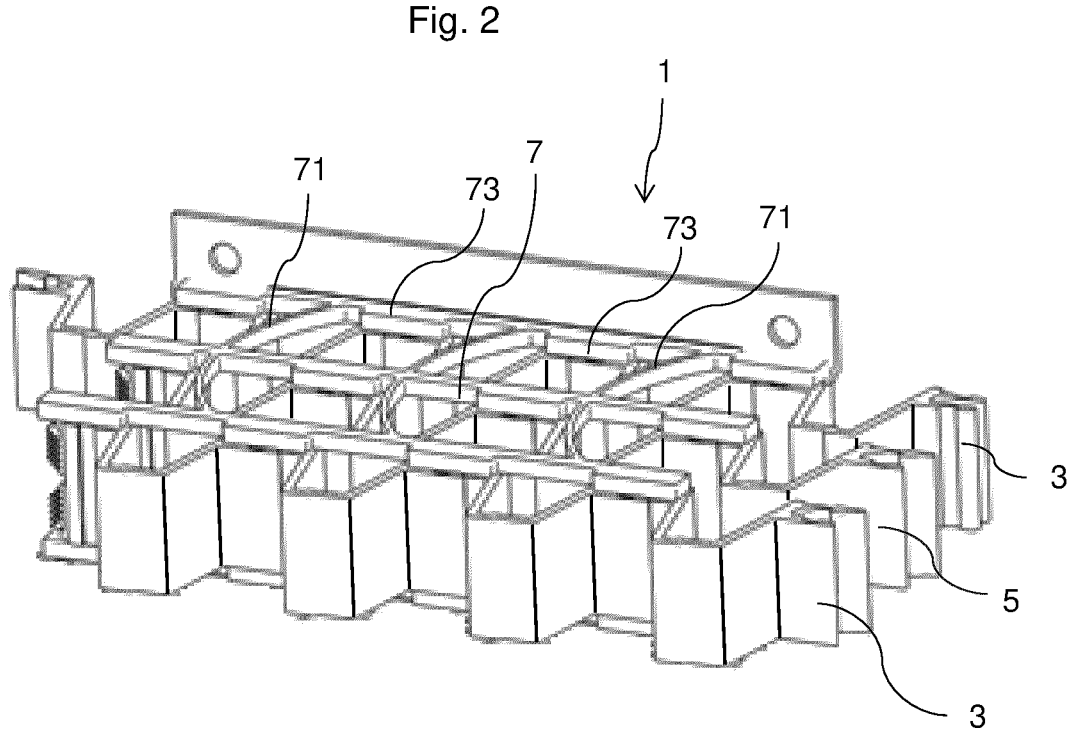
FIG. 1 shows a schematic, perspective view of a deformation structure according to an embodiment of the present invention in a starting position.

FIG. 1 shows a perspective view of a deformation structure 1 according to the first embodiment of the present invention in a starting position. The deformation structure 1 is mounted on a front end of a motor vehicle front section, in particular a motor vehicle front, in front of a bumper cross-beam which is not illustrated in place of a known pedestrian protection foam. In particular, the deformation structure 1 is arranged in a space between a vehicle outer skin which is not shown, that is to say, a bumper trim, and the bumper cross-beam.

As shown in FIG. 1, the deformation structure 1 has precisely three layers 3, 5, 3 which are arranged one behind the other. The layers 3, 5, 3 are spaced apart from each other and connected to each other by means of two deformation control devices 7 (only one can be seen in FIG. 1) at opposite sides of the layers 3, 5, 3.

Figure 9:
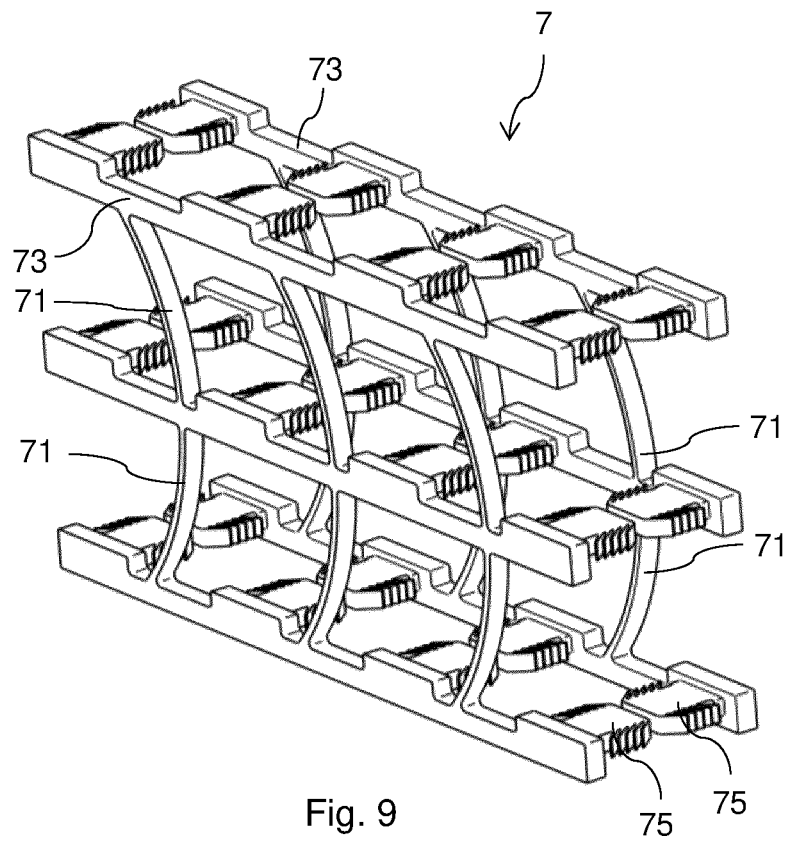
FIG. 9 shows a schematic perspective view of a deformation control device according to the embodiment of the present invention.

In FIG. 9, the deformation control device 7 is shown separately from the layers 3, 5, 3. The deformation control device 7 is securely pressed to each layer 3, 5, 3 at several locations by means of clips 75. Each deformation control device 7 has per layer pair three control webs 71. The control webs 71 are constructed in an oblique or curved manner so that the control webs 71 depending on a collision load or a collision pulse develop a hinge action in a specific direction. The control webs 71 extend in each case between two opposing securing webs 73. The control webs 71 between the uppermost layer 3 and the central layer 5 are formed in opposing directions to the control webs 71 between the central layer 5 and the lowest layer 3 so that the hinge actions thereof face in opposing directions. Each securing web 73 is associated with one of the layers 3, 5, 3. On each securing web 73, three clips 75 for engaging with a corresponding opening 37, 57 are arranged in the associated layer 3, 5, 3. The clips 75 have resilient projections for engaging behind the opening. Each deformation control device 7 is produced integrally from a plastics material injection-molding. The deformation control device 7 may also have more or fewer control webs 71. This is also dependent in particular on the dimensions of the layers 3, 5, 3 or the deformation structure 1. More than three layers, preferably an uneven number, are also possible. Accordingly, in this instance, the deformation control device has a corresponding number of securing webs. The hinge action of the control webs extends in this instance for each adjacent layer pair in opposing directions.

Figure 2:
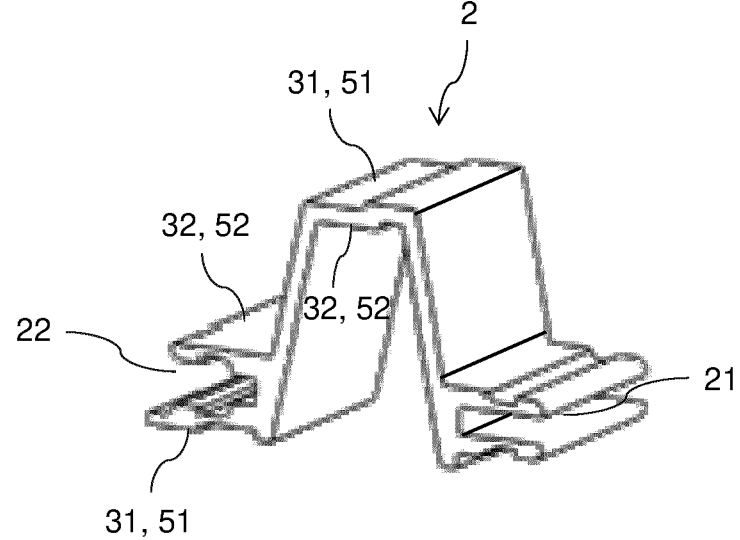
FIG. 2 shows a schematic, perspective view of a deformation base element of the deformation structure according to the embodiment of the present invention.

A deformation base element 2 is shown in FIG. 2. The deformation base element 2 is an extruded profile made of aluminum. From a continuous extruded profile, a large number of deformation base elements 2 can be cut to the desired length. The deformation base element 2 has a complete projection 31, 51 and a complete recess 32, 52. The deformation base element 2 further has at an end transversely with respect to the extrusion direction a spring 21. The spring 21 can also be referred to as a connection projection. Furthermore, the deformation base element 2 has at the other end transversely relative to the extrusion direction a groove 22 which can also be referred to as a connection groove. The deformation base element 2 can be connected to another identically constructed deformation base element 2 by means of a groove 22 and spring 21 in the form of a clip-fit connection. In this instance, the connection region of two deformation base elements 2 which are connected to each other in this manner with the spring 21 and groove 22 also forms a projection 31, 51 or a recess 32, 52. A large number of deformation base elements 2 which are connected to each other in this manner form the above-described layers 3, 5. Such a layer comprising a large number of deformation base elements 2 is then constructed in an undulating manner, wherein the wave troughs (recesses) and wave peaks (projections) have a substantially trapezoidal shape. With only a single type of deformation base elements 2, the layers 3, 5 may be formed with any number of projections and recesses. Based on only a single type of deformation base element 2, different deformation structures 1, for example, for different vehicle types and different requirements in different markets, can thereby be constructed.

Figures 3, 4, 5:
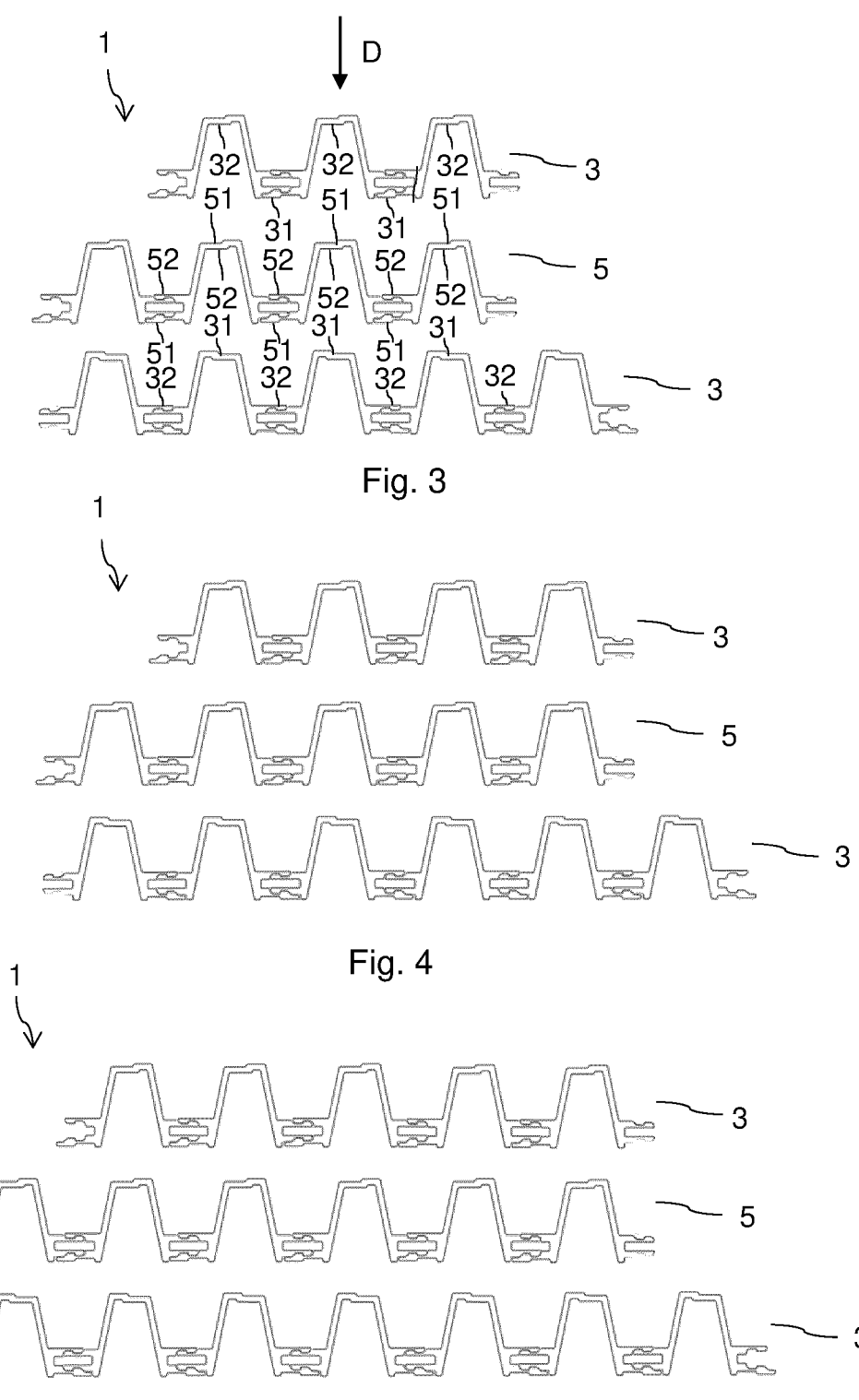
FIG. 3 shows a schematic side view of the deformation structure according to the embodiment of the present invention in a starting position.
FIG. 4 shows a schematic side view of the deformation structure according to a variant of the embodiment of the present invention in a starting position.
FIG. 5 shows a schematic side view of the deformation structure according to another variant of the embodiment of the present invention in a starting position.

FIG. 3 shows a side view of the deformation structure 1 without any illustration of the deformation control devices 7, wherein a potential deformation direction D of the deformation structure 1 in FIG. 3 extends in a downward direction and is illustrated by an arrow D. The deformation direction D is in this instance a longitudinal vehicle direction. A transverse direction in the drawing plane corresponds to a transverse vehicle direction. In the deformation direction D, the deformation structure 1 has its deformation function. The layers 3, 5, 3 have an at least similar construction. A first layer 3 from the top comprises in each case three deformation base elements 2 with alternating projections 31 and recesses 32. Furthermore, the second, central layer 5 comprises from above four deformation base elements 2 with alternating projections 51 and recesses 52. This is adjoined by an additional layer 3 comprising in each case five deformation base elements having alternating projections 31 and recesses 32.

The deformation structure 1 illustrated in FIG. 3 differs from the deformation structure 1 illustrated in FIG. 1 in that in FIG. 1 all the layers 3, 5, 3 have the same number of deformation base elements 2. The deformation structure 1 shown in FIG. 3 is improved compared with the deformation structure 1 shown in FIG. 1 in that the deformation structure 1 of FIG. 3 has no substantially ineffective deformation base elements 2.

FIG. 4 shows a deformation structure 1 which illustrates a variant of the deformation structure 1 illustrated in FIG. 3. The uppermost layer 3 comprises four deformation base elements 2. The central layer 5 comprises five deformation base elements 2. The lowest layer 3 comprises six deformation base elements 2.

FIG. 5 shows a deformation structure 1 which illustrates another variant of the deformation structure 1 illustrated in FIG. 3. The uppermost layer 3 comprises four deformation base elements 2. The central layer 5 comprises five deformation base elements 2. The lowest layer 3 comprises six deformation base elements 2.

Figures 6, 7, 8:
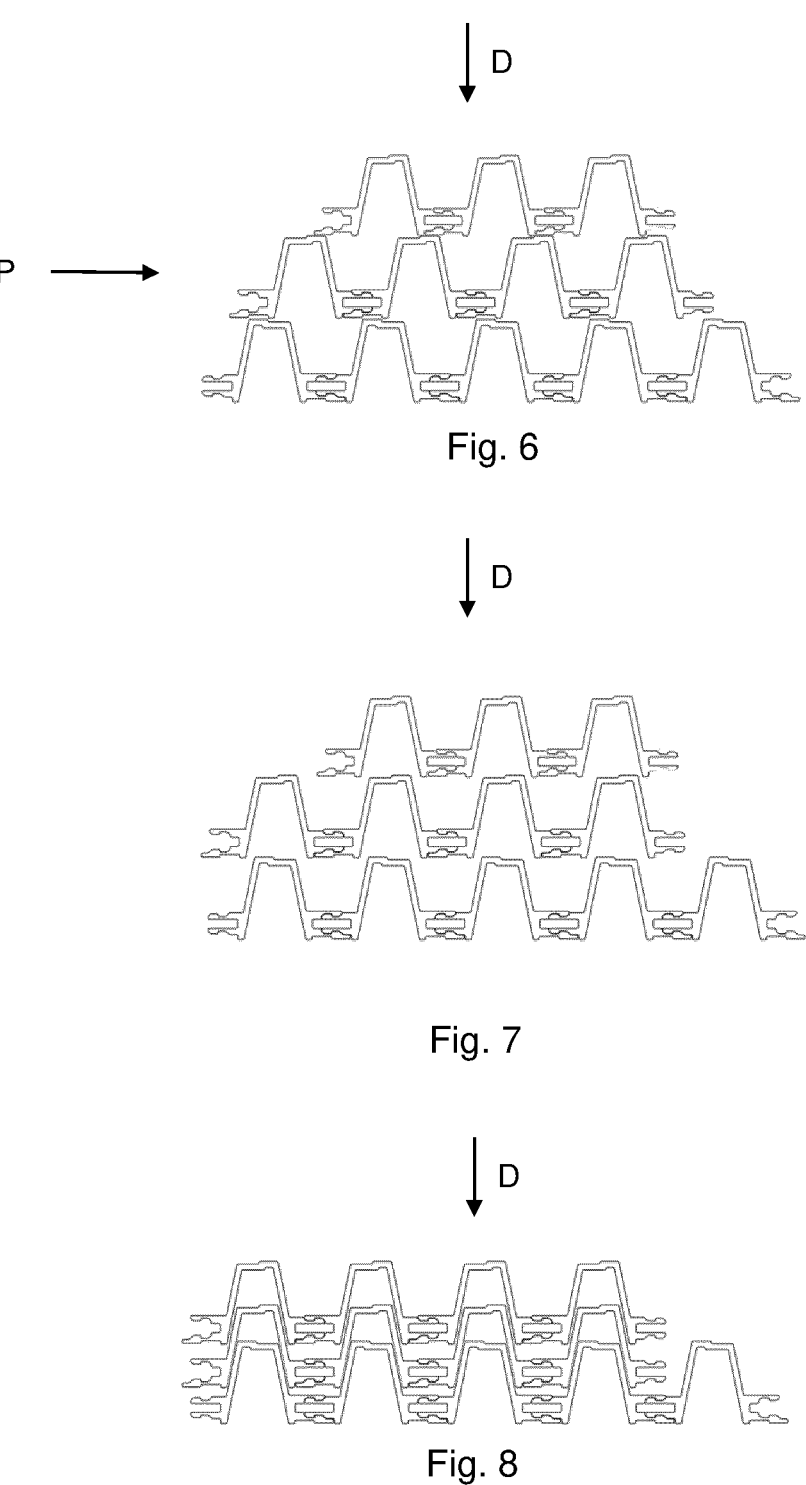
FIG. 6 shows a schematic side view of the deformation structure according to the embodiment of the present invention in the event of a collision load with a low collision pulse.
FIG. 7 shows a schematic side view of the deformation structure according to the embodiment of the present invention in the event of a collision load with a higher collision pulse during the deformation.
FIG. 8 shows a schematic side view of the deformation structure according to the embodiment of the present invention in the event of a collision load with a higher collision pulse at the end of the deformation.

With reference to FIGS. 6, 7 and 8, a function of a deformation structure using the example of the deformation structure 1 of FIG. 3 is described below with different collision loads. In the event of a front-end collision of the motor vehicle with an object or a person, a load or at least one resultant force from a collision load, acts in the longitudinal vehicle direction, that is to say, the deformation direction D, on the deformation structure 1, wherein the foremost layer 3 (in the Figures, the uppermost layer) is displaced with resilient deformation of the control webs 71 in the direction of the central layer 5. Furthermore, the central layer 5 is displaced in the direction of the rear layer 3 (in the Figures, the lowest layer). In the starting position of the deformation structure 1, which is shown in FIG. 3, the projections 31 of the layers 3 and the recesses 52 of the layers 5 and the recesses 32 of the layers 3 and the projections 51 of the layers 5 are opposite each other. If the layers 3 and the layers 5 were not connected to each other by means of the control webs 71, adjacent layers 3, 5 could be displaced from this starting position in a substantially unimpeded manner with only little resistance toward each other and inside each other.

FIG. 6 shows the collision load with a low collision pulse which occurs, for example, at a collision speed of the motor vehicle of less than a predetermined collision speed of 20 km/h and which is less relevant for pedestrian protection. FIGS. 7 and 8 show a collision load with a high or higher collision pulse which occurs, for example, at a collision speed of the motor vehicle greater than or equal to the predetermined collision speed of 20 km/h. The predetermined collision speed is in this instance mentioned only by way of example and may also have a different value.

Firstly, with reference to FIG. 6, a function of the deformation structure 1 in the event of the collision of the motor vehicle at the collision speed of less than 20 km/h is described.

The control webs 71 are arranged and configured in such a manner that with the low collision pulse the adjacent layers 3, 5 are subjected to a pivot movement with respect to each other whilst they are pressed in the direction toward each other. Since the lowest layer 3 is fixed to the bumper cross-beam and the uppermost layer 3 is also substantially fixed as a result of the action of force in the event of the collision, only the central layer 5 can give way and be displaced in a parallel manner in the direction P which is predetermined by the control webs 71 (that is to say, in a direction transverse with respect to the collision direction or deformation direction). The control webs 71 act in this instance, for example, as so-called film hinges which support the pivot movement or define the pivot path. With this pivot movement, in addition to the movement toward each other, there is brought about a parallel displacement of the adjacent layers 3 and 5 with respect to each other. In this instance, the projections 31 of the layers 3 reach a position opposite the projections 51 of the layers 5 until the upper sides or end faces of the projections 31 of the layers 3 come into contact with the upper sides or end faces of the projections 51 of the layers 5 (the state which is shown in FIG. 6). In this instance, the upper sides or the end faces of the projection 31 and 51 may be configured in such a manner that an additional parallel displacement of the layers 3 and 5 with respect to each other is made more difficult.

Consequently, in the case of the slow collision speed and consequently the low collision pulse, the deformation structure 1 depending on the collision load level transmits the collision load in the state of FIG. 6 directly to a structure of the motor vehicle which is behind, that is to say, the bumper cross-beam, or the individual layers 3, 5, 3 of the deformation structure 1 fail after the projections 31, 51 meet each other in a brittle manner by means of breakage and/or failure as a result of plastic deformation at a higher load level than the more rapid collision speed. Preferably, the deformation structure 1 is configured in such a manner that it does not fail and consequently a penetration depth of a collision opponent remains small. The penetration depth of the obstacle or the opposing vehicle is in this instance, as a result of the low deformation of the deformation structure, initially lower and so-called crash boxes via which the bumper cross-beam is connected to longitudinal beams (engine carriers) of the body can sufficiently absorb collision energy. On the whole, damage to the motor vehicle can thus be kept sufficiently low.

In particular, the deformation structure 1 may be configured in such a manner that at collision speeds of, for example, less than 4 km/h, it can transmit a collision load to the crash structure without failure of the deformation elements 3. That is to say, the control webs 71 are only resiliently deformed and the structure of the layers 3 and 5 itself does not fail. This is advantageous if with so-called parking bumps or the like no damage which requires repair is intended to occur on the motor vehicle and, for example, has an influence on an insurance rating of the motor vehicle. The deformation structure 1 moves after the parking bump as a result of the resilient restoring force of the deformation control devices 7 resiliently back into the starting position thereof again. At collision speeds from 4 km/h to approximately 20 km/h, the collision energy is so high that the crash boxes have to absorb collision energy as a result of deformation, wherein the collision load is transmitted via the position of the deformation structure 1 as shown in FIG. 3 (where possible, without further deformation) via the bumper cross-beam to the crash boxes. However, the damage to the front end of the vehicle front may be kept relatively small on the whole as a result of the mentioned small penetration depth.

With reference to FIGS. 7 and 8, a function of the deformation structure 1 in the event of a collision of the motor vehicle at a collision speed greater than or equal to 20 km/h is described below.

The control webs 71 are arranged and configured in such a manner that they fail at the high collision pulse or are folded together to a greater or lesser extent so that they cannot have any hinge action. In this instance, the mass inertia of the layers 3, 5, 3 is at the high or relatively high collision pulse in particular so large that the control webs 71 cannot bring about or support any lateral displacement movement (parallel displacement) of the layers 3, 5, 3 with respect to each other. The projections 31 of the layers 3 and the recesses 52 of the layers 5 and the projections 51 of the layers 5 and the recesses 32 of the layers 3 are thereby moved directly toward each other. In the course of the collision and deformation of the deformation structure 1, the projections 31 of the layers 3 are pushed completely into the recesses 52 of the layers 5. The projections 51 of the layers 5 are also completely pushed into the recesses 32 of the layers 3. Since, to this end, substantially no deformation of the structure of the layers 3 or the layers 5 is required and only the control webs 71 become deformed, there is a deformation of the deformation structure 1—at least as far as the state shown in FIG. 8—at a relatively low force level.

This is advantageous since it is important from the collision speed of approximately 20 km/h that the front end of the motor vehicle front and in particular the bumper trim together with the deformation structure 1 reacts in a sufficiently soft manner at a low deformation force level in order to protect a pedestrian. The front end then acts in a similarly soft manner as in the arrangement of the known pedestrian foam in place of the deformation structure according to the invention. If the collision opponent is a pedestrian, accordingly at a speed of approximately 20 km/h and more, a relatively low force advantageously acts on the pedestrian.

On the whole, consequently, as a result of the deformation structure 1 according to the invention, it is possible to overcome a conflict of objectives, which, on the one hand, at very low collision speeds which are not relevant for pedestrian protection, enables a sufficiently high rigidity of the deformation structure 1 or a sufficiently large deformation force level of the deformation structure 1 or a sufficiently large force transmission to the structure located behind with the bumper cross-beam in the crash boxes and, at a slightly higher collision speed which is relevant to passenger protection, ensures sufficient pedestrian protection as a result of a low deformation force level.

The invention claimed is:

1. A deformation structure, comprising:

at least a first layer and a second layer which are arranged spaced apart from each other in a deformation direction so as to be able to be displaced with respect to each other, wherein the first layer and the second layer have complementary projections and recesses which are constructed such that the projections of the first layer and the recesses of the second layer and the projections of the second layer and the recesses of the first layer are introducible into each other; and a deformation control device by which the first layer and the second layer are connected to each other such that:

(i) in an event of a high pulse in the deformation direction, the projections of the first layer are introduced into the recesses of the second layer and the projections of the second layer are introduced into the recesses of the first layer so that a deformation of the deformation structure in the deformation direction is carried out at a low force level, and (ii) in an event of a low pulse in the deformation direction, the projections of the first layer meet the projections of the second layer so that a deformation of the deformation structure in the deformation direction is carried out at a high force level;

wherein the first layer and the second layer are formed from a large number of identical, individually produced, deformation base elements, the deformation base elements forming each layer being interconnected, and wherein lateral connection regions in a layer between two adjacent deformation base elements in the layer form respective ones of the projections or recesses.

2. The deformation structure according to claim 1, wherein each deformation base element has a projection and/or a recess.

3. The deformation structure according to claim 1, wherein the deformation base elements are connected to each other:

in a materially engaging manner, via adhesive bonding or welding, and/or in a positive-locking manner by an undercut clip-fit connection.

4. The deformation structure according to claim 1, wherein the deformation base elements are extruded base elements.

5. The deformation structure according to claim 4, wherein the extruded base elements are aluminum extruded base elements.

6. The deformation structure according to claim 1, wherein the deformation base elements are shaped or injection-molded.

7. The deformation structure according to claim 1, wherein the deformation control device is constructed separately from the first and second layers, and is connected thereto in a releasable or non-releasable manner.

8. A motor vehicle comprising a deformation structure according to claim 1, wherein the deformation structure is arranged between a vehicle outer skin element and a body carrier element.

9. The motor vehicle according to claim 8, wherein the vehicle outer skin element is a bumper trim, and the body carrier element is a bumper cross-beam.

10. A deformation structure, comprising:

at least a first layer and a second layer which are arranged spaced apart from each other in a deformation direction so as to be able to be displaced with respect to each other, wherein the first layer and the second layer have complementary projections and recesses which are constructed such that the projections of the first layer and the recesses of the second layer and the projections of the second layer and the recesses of the first layer are introducible into each other; and a deformation control device by which the first layer and the second layer are connected to each other such that:

(i) in an event of a high pulse in the deformation direction, the projections of the first layer are introduced into the recesses of the second layer and the projections of the second layer are introduced into the recesses of the first layer so that a deformation of the deformation structure in the deformation direction is carried out at a low force level, and (ii) in an event of a low pulse in the deformation direction, the projections of the first layer meet the projections of the second layer so that a deformation of the deformation structure in the deformation direction is carried out at a high force level;

wherein the first layer and the second layer are formed from a large number of identical, individually produced, deformation base elements, the deformation base elements forming each layer being interconnected, wherein the first layer comprises n deformation base elements and the second layer comprises n−1 deformation base elements.

11. A deformation structure, comprising:

at least a first layer and a second layer which are arranged spaced apart from each other in a deformation direction so as to be able to be displaced with respect to each other, wherein the first layer and the second layer have complementary projections and recesses which are constructed such that the projections of the first layer and the recesses of the second layer and the projections of the second layer and the recesses of the first layer are introducible into each other; and a deformation control device by which the first layer and the second layer are connected to each other such that:

(i) in an event of a high pulse in the deformation direction, the projections of the first layer are introduced into the recesses of the second layer and the projections of the second layer are introduced into the recesses of the first layer so that a deformation of the deformation structure in the deformation direction is carried out at a low force level, and (ii) in an event of a low pulse in the deformation direction, the projections of the first layer meet the projections of the second layer so that a deformation of the deformation structure in the deformation direction is carried out at a high force level;

wherein the first layer and the second layer are formed from a large number of identical, individually produced, deformation base elements, the deformation base elements forming each layer being interconnected, wherein the deformation structure comprises precisely three layers which are arranged one above the other, the first layer comprises n deformation base elements, the second layer comprises n−1 deformation base elements, and the third layer comprises n−2 deformation base elements.

* * * * *